United States Patent [19] [11] 4,162,692
Greer et al. [45] Jul. 31, 1979

[54] HYDRO-PNEUMATIC FLEXIBLE BLADDER ACCUMULATOR

[75] Inventors: Edward M. Greer, Beverly Hills; Frank S. Wyle, Los Angeles, both of Calif.; Martin R. Packer, Handforth, England

[73] Assignee: Hydrotrole Limited, Stockport, United Kingdom

[21] Appl. No.: 720,886

[22] Filed: Sep. 7, 1976

[51] Int. Cl.$^2$ .............. F16L 55/04
[52] U.S. Cl. .............. 138/30
[58] Field of Search .............. 138/30

[56] References Cited

U.S. PATENT DOCUMENTS

| | | | |
|---|---|---|---|
| 3,256,911 | 6/1966 | Mercier et al. | 138/30 |
| 3,333,600 | 8/1967 | Mercier | 138/30 |
| 3,486,530 | 12/1969 | Mercier | 138/30 |
| 3,570,544 | 3/1971 | Ortheil | 138/30 |
| 3674,054 | 7/1972 | Mercier | 138/30 |
| 3,693,348 | 9/1972 | Mercier | 138/30 |
| 3,931,834 | 1/1976 | Caillet | 138/30 |

FOREIGN PATENT DOCUMENTS

| | | | |
|---|---|---|---|
| 270146 | 12/1963 | Australia | 138/30 |
| 1283724 | 8/1972 | United Kingdom | 138/30 |

*Primary Examiner*—Houston S. Bell, Jr.
*Assistant Examiner*—John W. Shepperd
*Attorney, Agent, or Firm*—Blakely, Sokoloff, Taylor & Zafman

[57] ABSTRACT

A pressure vessel in the form of a hydro-pneumatic flexible bladder accumulator is provided which includes a shell formed of a cylindrical tube. An open-ended thimble-shaped deformable bladder of resilient material is positioned within the shell. A port plate is attached to one end of the tube, and a closure cap is retained in the other end of the tube. The cap may be retained in the other end of the tube, for example, by a removable locking ring. The closure cap has an inner end which may be displaced radially inwardly from the inner surface of the shell, and it has three axially spaced peripheral grooves on the inner end which respectively receive an O-ring to prevent leakage of liquid out of the accumulator, and two integral beads that surround the mouth of the bladder. One of the integral beads of the bladder has the shape of an O-ring, and it is received in one of the grooves to form an effective seal for the interior of the bladder. The other integral bead has a V-shape and it serves as an anchoring means for the bladder, and it is received in the other groove. An anti-extrusion button valve is provided on the other end of the bladder which eliminates the need for the prior art spring-loaded poppet valve assembly. A spacer ring of yieldable material is also provided at the other end of the shell, adjacent the port plate.

4 Claims, 3 Drawing Figures

HYDRO-PNEUMATIC FLEXIBLE BLADDER ACCUMULATOR

BACKGROUND OF THE INVENTION

The present invention is concerned with a pressure vessel type of hydro-pneumatic accumulator which includes, for example, a thimble-shaped flexible bladder mounted in an outer shell, and which separates the interior of the shell into two chambers which are sealed from one another. The shell usually has a closed end. A port is formed in the closed end of the shell in communication with one of the two chambers within the shell. This port is usually referred to as the "liquid" port, and the adjacent chamber constitutes the "liquid" chamber of the accumulator. A cap is usually mounted on the other end of the shell, and it includes a valved "gas" port which communicates with the other chamber within the shell, and which constitutes the "gas" chamber.

A compressible gas, such as nitrogen, is permanently charged and compressed under high pressure, and is introduced through the gas valve into the gas chamber of the accumulator. Subsequently, an appropriate hydraulic liquid under high pressure is pumped through the liquid port into the liquid chamber.

As the hydraulic liquid is pumped into the liquid chamber, a balanced high pressure is maintained in both the liquid and gas chambers. By this action, energy is stored or absorbed by the gas chamber of the accumulator, which tends to force the hydraulic liquid out of the liquid chamber to enable the hydraulic liquid to perform useful work.

In the construction of accumulators of the type with which the present invention is concerned, and as explained above, the bladder is mounted within the shell between the gas valve at one end and the liquid port at the other end. As also mentioned above, in the usual prior art construction, one end of the shell is open, and a cap is usually welded to the shell to close the open end. This welding operation created problems in the prior art because the bladder was normally bonded to the shell prior to the welding operation, and the heat from the welding had a tendency to damage the bond and the bladder itself.

Attempts to overcome this problem in the prior art included the provision of an annular mounting sleeve which was bonded to the mouth of the bladder in coaxial relationship with the bladder, and which extended coaxially out from the mouth of the bladder. The opposite end of the sleeve was welded to the inner face of the cap, or to the shell, to mount the bladder in position within the shell. With such a construction, the only heat passed from the weld to the bladder bond was along the sleeve, and the sleeve was made sufficiently thin and sufficiently long so that any heat reaching the bladder bond was hopefully of insufficient intensity to damage the bond.

However, in order to perform its intended purpose, it was essential for the sleeve to support the bladder with its outer surface displaced radially inwardly from the inner surface of the shell, and although the construction was found to alleviate the problem of heat damage to the bladder bond, it was found that under pressure operating conditions a portion of the bladder adjacent the bond would "creep" up between the sleeve and the adjacent inner surface of the shell. This resulted in rapid wear and damage to the bladder.

In the construction of the present invention, an integral O-ring seal is provided between the mouth of the bladder and the inner end of the closure cap. The mouth of the bladder is resiliently drawn over the inner end of the closure cap to permit the integral sealing O-ring bead to be received in one of the grooves in the inner end of the retaining cap.

In accordance with the concepts of the invention, a separate integral anchoring bead is provided around the mouth of the bladder which is received in the second groove in the inner end of the closure cap or a separate retaining ring. The bladder is not bonded or in any way affixed to the closure cap, since the bladder is securely held on the closure cap without any need for bonding it to the cap, by the separate anchoring bead.

DETAILED DESCRIPTION OF THE ILLUSTRATED EMBODIMENT

Figure 1:
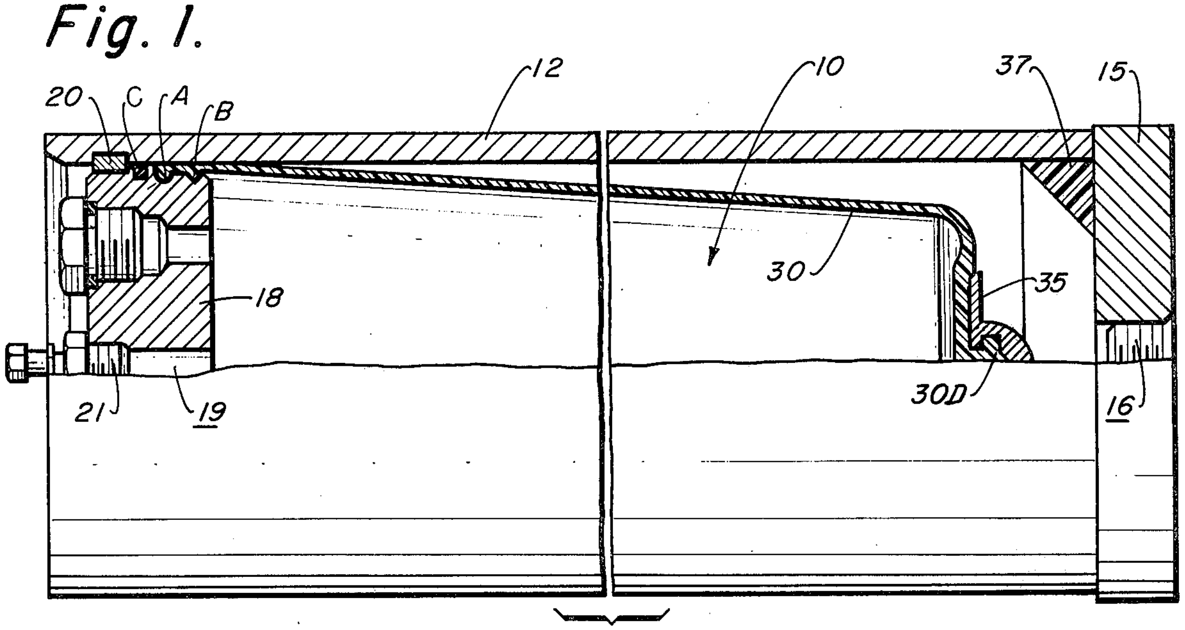
FIG. 1 is a side section of one embodiment of the invention in which the internal bladder is supported in the shell on the inner end of the closure cap of the assembly.

In the embodiment of FIG. 1, a hydro-pneumatic accumulator 10 is illustrated. The accumulator comprises an elongated cylindrical tube 12, formed, for example, of cold drawn heavy wall steel tubing. A disc-shaped port plate 15 is inertia welded, or otherwise attached to one end of tube 12, and a liquid port 16 extends through plate 15. A closure cap 18 is mounted in the other end of tube 12 by means, for example, of a removable retaining snap ring 20. A gas port 19 extends through cap 18, and a gas charging valve assembly 21 is mounted within the port 19. In the illustrated construction, the snap ring 20 may be removed when the unit is depressurized, permitting the cap 18 to be withdrawn and providing access to the interior of the shell for repair or replacement purposes without the need to remove the unit from the system in which it is installed.

The inner end of cap 18 is spaced radially inwardly from the inner surface of tube 12 to constitute a mount for the accumulator bladder, as an alternative, a separate retaining ring may be used. Three axially spaced grooves A, B and C are formed in the inner end of cap 18. Groove A has a rectangular section and groove B has a triangular section, in the illustrated embodiment. Groove C supports an O-ring to prevent leakage of the liquid through the left-hand end of the tube 12.

Figure 2:
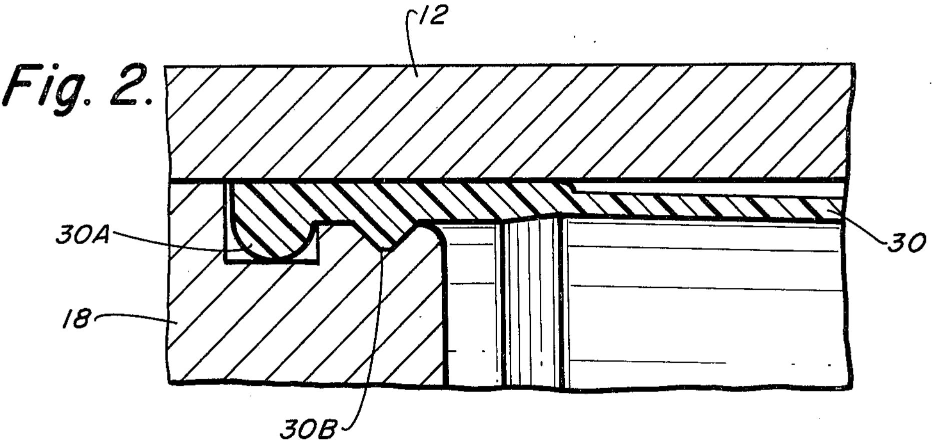
FIG. 2 is an enlarged fragmentary detail of the mouth of the bladder.
Figure 3:
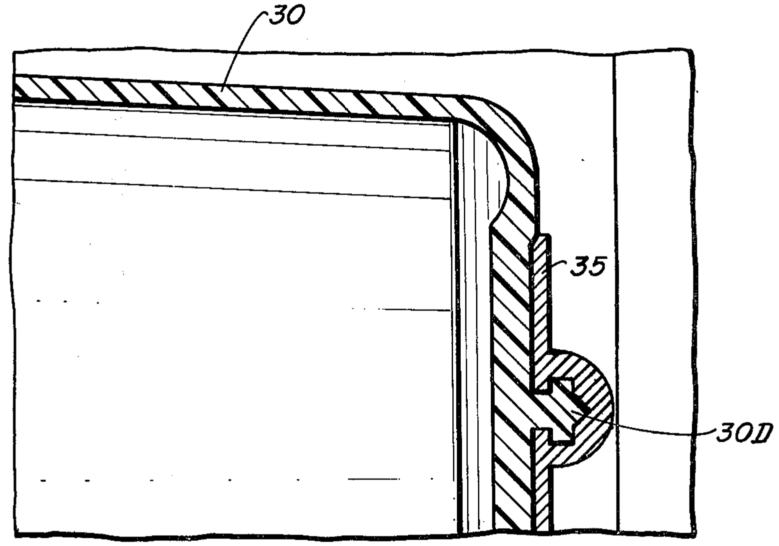
FIG. 3 is a fragmentary enlarged detail of a portion of the other end of the bladder, showing the anti-extrusion button valve.

A bladder 30, formed of an appropriate stretchable, resilient, deformable material, such as synthetic rubber, and having a thimble-like configuration, is mounted on the inner end of cap 18, as shown. Specifically, the rim of bladder 30 adjacent to its mouth has an inner integral sealing bead 30A (FIG. 2) which has an O-ring shape, and which is received in groove A of cap 18. The bladder 30 also has a triangular-shaped integral internal anchoring bead 30B axially spaced from bead 30A and which is received in groove B of cap 18.

A metallic anti-extrusion button 35 is attached to the closed end wall of bladder 30. The button 35 is anchored to a portion 30D at the end of bladder 30. The button 35 functions both as a valve which extends into and closes the liquid port 16 when the end of the bladder 30 is forced against port plate 15, and the button has an annular shoulder which serves to prevent the end of the bladder from extending into the port with resulting destruction of the bladder, as gas within the bladder forces the bladder against port plate 15.

A spacer ring 37 of yieldable deformable material is mounted adjacent the inner surface of port plate 15 in the corner between the plate and the end of tube 12. This spacer ring serves to prevent the end of the bladder from extending into the corner and squaring out with resulting overstretching which could cause the bladder to tear and burst.

During the gas charging operation, a pressurized gas, such as dry nitrogen, is introduced through port 19 into the interior of bladder 10. As the internal pressure within bladder 10 rises, and due to the sealing action of the O-ring bead 30A, the rim of the bladder is wedged into the space between the inner end of disc 18 and the inner end of tube 12. The anchoring bead 30B prevents the bladder from being pulled off the end of the cap 18, and no bonding is required.

The spacer ring 37 permits the accumulator to be built simply and inexpensively merely by cutting existing tubes to a desired length to form tube 12, and then cutting the port plate 15 from existing bar stock, and inertia welding the port plate to one end of the tube. This obviates any necessity for the casing to be forged or cast in an arcuate shape, as is the case with most prior art accumulators.

The provision of the separate anchoring and sealing beads A and B permits the bladder 30 firmly to be retained on the inner end of the cap 18, or on a separate retaining ring, without any need for bonding the bladder to the cap, the need for such bonding having created problems in the prior art.

The button assembly at the other end of the bladder, as described, serves as a valve to close the liquid port 16 when the end of the bladder is driven against the plate 15, and also serves to prevent the end of the bladder from being extruded into the port 16. The spacer 37, as described, prevents damage to the bladder as its end is forced against plate 15. The cap 18, as also described, is removably retained within the other end of the shell, and can be removed when the unit is depressurized for servicing purposes.

The invention provides, therefore, an improved hydro-pneumatic flexible bladder accumulator, having a casing which can be simply and inexpensively constructed, and in which the bladder is firmly and securely mounted within the shell without the need for bonding it to its supporting structure, and in which the bladder is supported in a manner such that there is no tendency for the bladder to sustain excessive wear during the operation of the accumulator.

It will be appreciated that while a particular embodiment of the invention has been shown and described, modifications may be made. It is intended in the claims to cover the modifications which come within the true spirit and scope of the invention.

What is claimed is:

1. A hydro-pneumatic accumulator comprising: an elongated tube open at both ends and having a peripheral groove on the inner surface thereof adjacent to one of said ends; a closure cap mounted within said one end of said tube having a gas port extending therethrough, said closure cap having an inner end spaced radially inwardly from the inner surface of said tube to form a mounting means, said mounting means having a pair of axially spaced peripheral grooves formed thereon; a flat disc-shaped plate affixed to said other end of said tube and having a liquid port extending therethrough; a spacer ring formed of deformable material mounted at said other end of said tube engaging the inner surface of said tube and the inner surface of said plate; a thimble-shaped bladder of a resilient, deformable material mounted in said tube with its mouth extending over said mounting means in resilient engagement therewith, said bladder having an internal integral sealing bead surrounding the rim of its mouth to be compressibly received in the inner one of said grooves, and an integral anchoring bead surrounding its mouth axially displaced inwardly from the sealing bead to be received in the outer one of said grooves; and a removable snap ring received in the peripheral groove extending around the inner surface of said tube at said one end thereof for retaining the closure cap in said one end of said shell, said sealing bead having essentially the shape of an O-ring, said anchoring bead having a triangular shape, the inner one of said grooves on said mounting means which receives said sealing bead having a rectangular configuration, and the outer one of said grooves on said mounting means which receives said anchoring bead having a complementary triangular shape.

2. The hydro-pneumatic accumulator defined in claim 1, and which includes a spherical-shaped rigid button having a flat integral annular flange extending therearound mounted on the closed end of the bladder to prevent the bladder from entering said liquid port.

3. The hydro-pneumatic accumulator defined in claim 1, in which said plate is mounted to the end of the tube by an inertia weld.

4. The hydro-pneumatic accumulator defined in claim 1, in which said mounting means has a third peripheral groove thereon adjacent to said removable ring, and which includes an O-ring seal positioned in said third peripheral groove.

* * * * *